United States Patent
Jordan

(10) Patent No.: US 7,231,667 B2
(45) Date of Patent: Jun. 12, 2007

(54) SYSTEM AND METHOD FOR COMPUTER VIRUS DETECTION UTILIZING HEURISTIC ANALYSIS

(75) Inventor: Myles Jordan, Melbourne (AU)

(73) Assignee: Computer Associates Think, Inc., Islandia, NY (US)

( * ) Notice: Subject to any disclaimer, the term of this patent is extended or adjusted under 35 U.S.C. 154(b) by 769 days.

(21) Appl. No.: 10/449,586

(22) Filed: May 29, 2003

(65) Prior Publication Data

US 2004/0243829 A1  Dec. 2, 2004

(51) Int. Cl.
*G06F 11/32* (2006.01)

(52) U.S. Cl. .......................................... 726/23; 726/24

(58) Field of Classification Search ............ 726/22–26; 713/188
See application file for complete search history.

(56) References Cited

U.S. PATENT DOCUMENTS

| | | | |
|---|---|---|---|
| 6,457,008 B1 * | 9/2002 | Rhee et al. | 707/10 |
| 6,711,583 B2 * | 3/2004 | Chess et al. | 707/104.1 |
| 7,093,135 B1 * | 8/2006 | Radatti et al. | 713/188 |

* cited by examiner

*Primary Examiner*—Hosuk Song
(74) *Attorney, Agent, or Firm*—Baker Botts L.L.P.

(57) ABSTRACT

A computer virus detection method includes compiling a list of heuristic events and a chronological order in which they occur, comparing the list of heuristic events and the chronological order with a defined list of heuristic events occurring in a defined chronological order and determining whether a computer virus is present based on a result of the comparing.

24 Claims, 4 Drawing Sheets

SYSTEM AND METHOD FOR COMPUTER VIRUS DETECTION UTILIZING HEURISTIC ANALYSIS

BACKGROUND OF THE DISCLOSURE

1. Field of the Disclosure

The present disclosure relates generally to computer virus detection and in particular, to a system and method for computer virus detection utilizing Heuristic analysis.

2. Description of the Related Art

Antivirus (AV) systems may use various methods for detecting malicious code. Malicious code as referred to herein may include a computer virus capable of replicating itself and spreading. More specifically, malicious code may be understood to include, for example, a piece of software that may be designed and written to make additional copies of itself and spread from location to location within a system and/or from system to system. Computer viruses may spread without user knowledge or permission.

Computer virus technology has gone through various evolutionary stages since the very first viruses. Early viruses infected files, but were not camouflaged in any substantial way. Accordingly, they could be easily recognized by even novice users utilizing file viewing software. This also meant that such viruses were relatively easily detected by AV systems.

To counter this, viruses were developed to use encryption as a method of disguising the viral code. However, these viruses still left undisguised decryption code visible to anti-virus software, and were thus fairly easily to recognize by AV systems. Virus developers thus sought to address this vulnerability in their computer viruses. To a certain degree, this was accomplished by a technique called polymorphism. This technique involves pseudo-randomly recreating (usually) different decryption code between each individual infection. With a polymorphic encrypted type of virus, although each individual infection may utilize a different decryption code, the actual unencrypted malicious code itself does not necessarily change.

As difficult as viruses protected by polymorphic encryption can be to detect, doing so is now a fairly common place event. Detection of polymorphic encrypted viruses can be readily accomplished via the emulation of the decryption code to gain access to the then-unencrypted virus body.

Currently, state-of-the-art virus technology is going through yet another evolutionary phase which utilizes a form of disguise called "metamorphism." A metamorphic disguise differs from previous forms of disguise in that such viruses no longer necessarily use encryption at all to disguise their code. Instead, such viruses reorganize, modify, or even recreate the code that forms the virus body itself.

One method of detecting such metamorphic viruses may involve the use of computationally intense, highly specialized algorithms targeted at specific viruses.

Various AV systems use heuristic detection methods to scan computer code to detect for malicious code. The methods may include some form of heuristics logic to determine whether particular computer codes is malicious. Heuristics logic applies rules to distinguish malicious code from non-malicious code. AV systems using heuristics logic may use self-educating techniques to improve performance.

AV systems may use a combination of emulation and heuristics to detect malicious code. Systems may include a machine emulator that emulates code in the scanning target, while collecting a set of data (e.g., Boolean flags) relating specifically to possible viral code. These systems can be referred to as utilizing static heuristics in that they do not pay attention to the order in which events occur in the emulation.

A deficiency with the static heuristics type system is that possibly very valuable information is regularly being discarded (e.g., the chronological order in which the heuristic data is being collected). If utilized properly, this discarded information can be fundamental to a virus scanner's ability to distinguish between false-positive results (e.g., code that seems viral enough to trigger a detection, but is not actually viral) and true-positive results (e.g., code that seems viral, and actually is).

SUMMARY OF THE DISCLOSURE

A computer virus detection method includes compiling a list of heuristic events and a chronological order in which they occur, comparing the list of heuristic events and the chronological order with a defined list of heuristic events occurring in a defined chronological order and determining whether a computer virus is present based on a result of the comparing.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
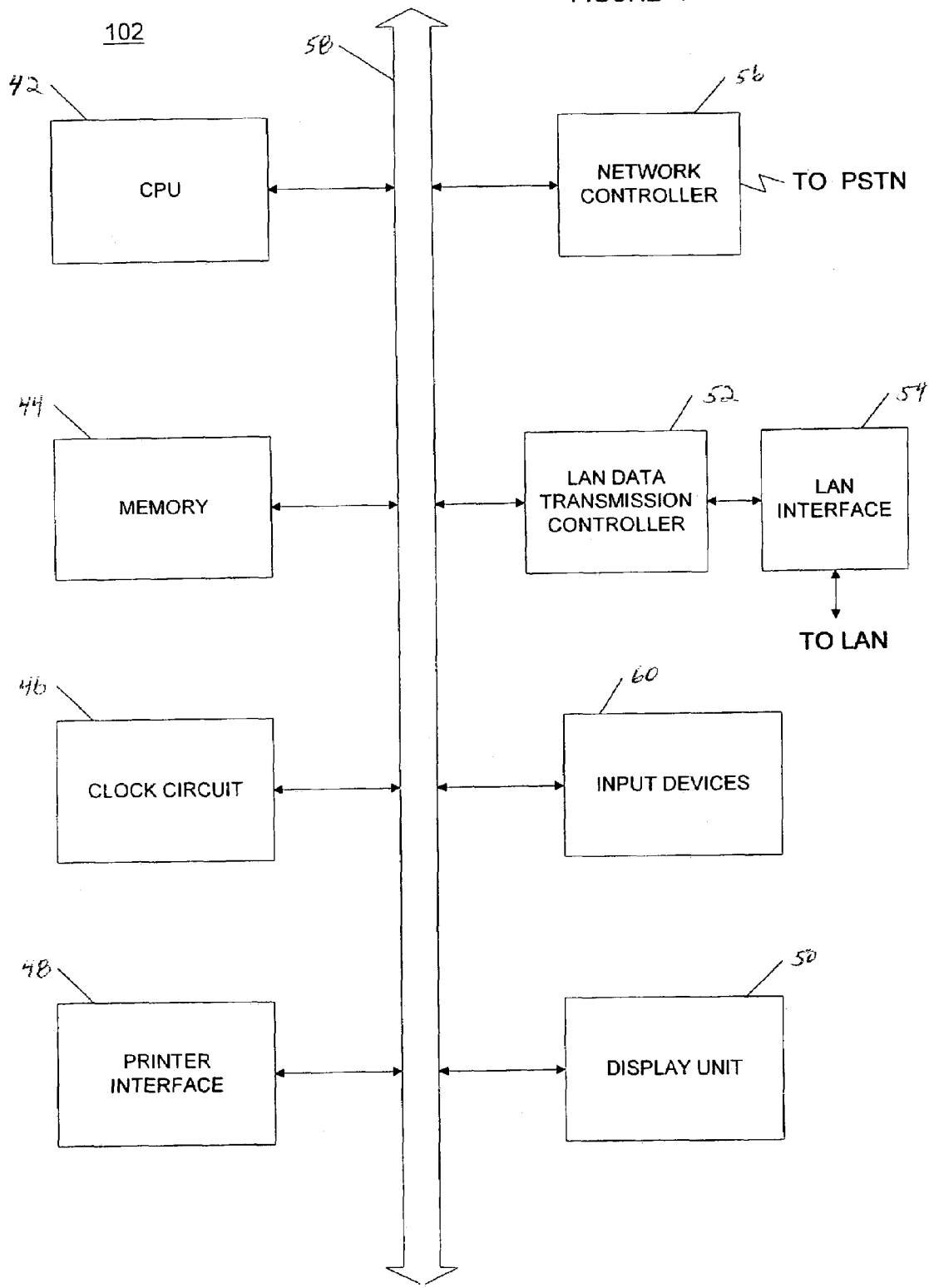
FIG. 1 is a block diagram of an example of a system to be monitored for malicious code.

In describing preferred embodiments of the present disclosure illustrated in the drawings, specific technology is employed for sake of clarity. However, the present disclosure is not intended to be limited to the specific terminology so selected and it is to be understood that each specific element includes all technical equivalents which operate in a similar manner.

A system to be monitored for malicious code may be a standard PC, laptop, mainframe, etc. or a network of such systems. FIG. 1 depicts an example of a system 102 that may be monitored for malicious code. Of course, system 102 may not include each component shown and/or may include additional components not shown. As shown, system 102 may include a central processing unit (CPU) 42, a memory 44, a clock circuit 46, a printer interface 48, a display unit 50, a LAN (local area network) data transmission controller 52, a LAN interface 54, a network controller 56, an internal bus 58 and one or more input devices 60 such as, for example, a keyboard and mouse.

CPU 42 controls the operation of system 102 and is capable of running applications stored in memory 44. Memory 44 may include, for example, RAM, ROM, removable CDROM, DVD, etc. Memory 44 may also store various types of data necessary for the execution of the applications, as well as a work area reserved for use by CPU 42. Clock circuit 46 may include a circuit for generating information indicating the present time, and may be capable of being programmed to count down a predetermined or set amount of time.

The LAN interface 54 allows communication between a network (not shown) and the LAN data transmission controller 52. The LAN data transmission controller 52 uses a predetermined protocol suite to exchange information and data with the other devices on a network. System 102 may also be capable of communicating with devices on other remote networks. System 102 may also be capable of communicating with other devices via a Public Switched Telephone Network (PSTN) using network controller 56. System 102 may also have access to a WAN (wide area network) and the Internet, for example. Internal bus 58, which may actually consist of a plurality of buses, allows communication between each of the components connected thereto.

The present system and method utilizes the anti-virus techniques of emulation and heuristics, in which the anti-virus software contains a machine emulator that emulates code in the scanning target, while collecting a set of data (e.g., Boolean flags) relating specifically to possible viral code, and is capable of analyzing the order of the events that occur.

Since the present system and method maintains the chronological order in which the heuristic data is collected, the present system is able to accurately piece together a collection of small-scale, detailed information into larger, "meta-heuristic" events, which can in turn be used to accurately detect viral behavior.

Although Metamorphic viruses may reorganize, modify or even recreate the code forming the virus body, it is important to note that metamorphic viruses still perform the same large-scale actions, independent of whatever form their code may take. In other words, although the actual code used by metamorphic viruses to perform a particular action may change from infection to infection, the actions being performed by the virus are still the same. This means that by coalescing small-scale actions into large-scale actions (referred to herein as meta-heuristic events) and thus ignoring the details of how this large-scale action is performed, it is possible to circumvent the power of metamorphic viruses. The present system and method thus take advantage of this inherent weakness of metamorphic viruses.

The present system thus utilizes information relating to the chronological ordered chain of heuristic events and its subsequent analysis by algorithms cognizant of the importance of the chronology of events to discover the existence of a virus infection and is particularly useful for detecting a metamorphic virus infection.

Figure 2:
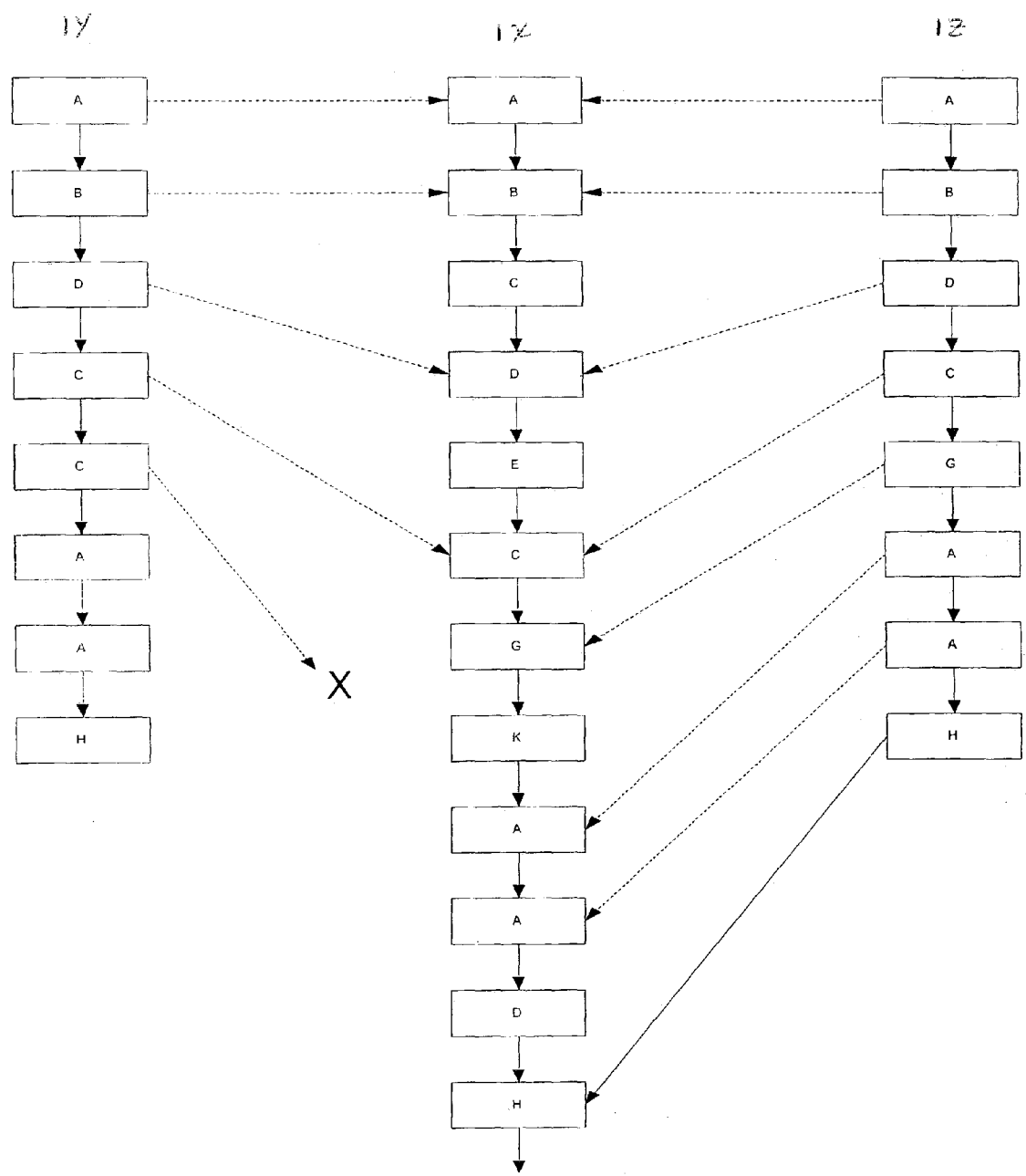
FIG. 2 depicts event chains for describing various aspects of the present disclosure.

FIG. 2 will be used to graphically show how meta-heuristic algorithms according to the present disclosure may function. Several event chains are shown in FIG. 2. That is, each labeled box represents an event as determined by one or more heuristics modules, according to the present disclosure. Different types of events may be detected. For example, certain memory read or write actions, certain decryptions that may be performed, certain types of executions (e.g., API executions), etc. may indicate viral behavior. In the described examples, like labels represent like events. The event chain labeled 1X represents an actual event chain, consisting of events A, B, C, D, E, C, etc., in that order. As will be described in more detail below, the actual event chain is generated by emulating the code (scanning target) being examined for viruses and using one or more heuristics modules to determine "events" that may or may not indicate viral behavior and saving information identifying the event and the order in which the events occurred. In this example, a meta-heuristic algorithm used for detecting a particular virus or type of virus may expect to see a particular series of events in a particular order, such as the events and order shown in chain 1Y (e.g., events A, B, D, C, C, etc.) In parsing the actual event chain 1X, the algorithm finds the first four events that it expects (e.g., events A, B, D, C). However, the algorithm will not locate the fifth expected event (e.g., event C) sequentially in the chain (even though event C does occur earlier in the chain 1X.) Accordingly, the algorithm will report that the current scanning target does not contain the virus that this algorithm was designed to detect.

In contrast, another algorithm may expect an event chain such as event chain 1Z. This algorithm would parse the actual event chain 1X and find all of its expected events in the correct order, as shown in FIG. 2. Accordingly, this algorithm would report that it has identified whatever virus, or type of virus, is was designed to detect.

The algorithms in the examples described above are simple in that they look for complete ordering of events (e.g., all events are in inflexible order.) However, this is for ease of description only and it should be understood that this is not necessarily always the case. For example, having found events A, B, D, an algorithm may look for an event B. If an event B is not found after event D in the actual chain, the algorithm may look to events occurring prior to event D for the occurrence of event B. In addition, an algorithm may simply skip an event if it is not found in the actual event chain and look for its next expected event in the chain. The number of events an algorithm looks for to determine whether a virus is present can be preset for each individual algorithm. In the alternative, the maximum number of events that each algorithm will be allowed to search for can be limited by the user of the system. However, the more events an algorithm is allowed to look for, the more accurate the determination by the algorithm will likely be.

The algorithms can be stored in the system 102 and used to detect viruses in the system. The algorithms may be periodically updated with new algorithms for detecting new viruses, automatically or in response to user request. The algorithms may also be stored at a remote website. In this case, the present system will be directed to the remote website so that it can download the algorithms for execution on the system or the system can execute the algorithms directly from the remote website.

Figure 3:
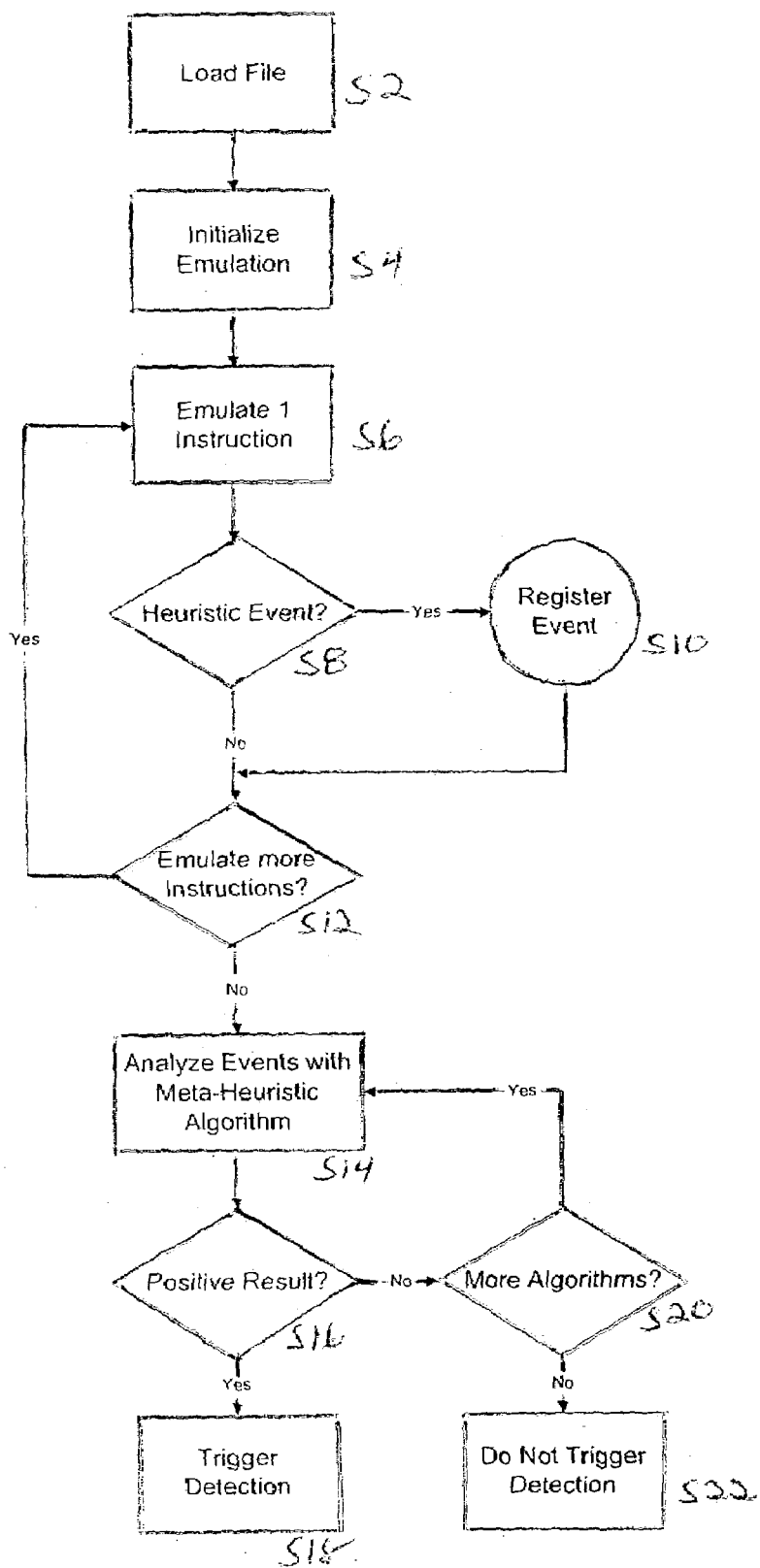
FIG. 3 is a block diagram of an emulation analysis process according to an embodiment of the present disclosure.

FIG. 3 is a flow chart for describing aspects of the present disclosure. The process involves emulating a number of instructions of the code of the file to be analyzed, collecting heuristic events in order as they occur, and storing them in some sequential fashion. The sequential heuristic events are then analyzed with each meta-heuristic algorithm at least once, until a virus is detected or there are no more available algorithms. That is, each algorithm in turn parses the sequential heuristic data (e.g., the heuristic event chain) looking for heuristic events in some form of at least partial order as expected by the algorithm. As noted above, the events may or may not be located in a particular order, depending on the algorithm itself and there can be other irrelevant events between expected events in the chain. Each algorithm will look for its expected events in the proper order.

In more detail, in Step S2, a file to be scanned for viruses is loaded into the emulator. The emulator is then initialized (Step S4). Initialization may involve setting registers, flags and memory to predefined values. The first instruction (or instructions) in the file is then executed (Step S6). A determination is then made whether a heuristic event has occurred (Step S8). If a Heuristic event has occurred (Yes, Step S8), the event is registered (Step S10). After the event is registered or if no heuristic event has occurred (No, Step S8), a determination is made whether there are more instructions to emulate (Step S12). If there are more instructions to emulate (Yes, Step S12), the next instruction is emulated in Step S6 and the procedure repeats. If there are no more instructions to emulate (No, Step S12), the heuristic events registered in Step S10 are analyzed utilizing one of the algorithms for detecting a virus or type of virus (Step S14). A determination is then made whether the algorithm has yielded a positive result (e.g., detected a virus) in Step S16. If a positive result was achieved (Yes, Step S16), a trigger detection operation (Step S18) is performed. For example, Step S18 may provide some type of indication to the user of the system that a virus was detected and may indicate the particular virus or type or virus to the user. Step S18 may also start, either automatically or in response to a user input, a virus removal system for removing the detected virus. If a positive result is not indicated (No, Step S16), a determination is made whether more algorithms exist (Step S20). As mentioned above, this may involve seeing if any more algorithms are present on the system or going to a remote website to determine if any more algorithms exist. If no more algorithms exist (No, Step S20), a detection is not triggered (Step S22). This may involve informing the user that no viruses were detected in the file being examined. If more algorithms are available (Yes, Step S20) a next algorithm is selected and is used to analyze the heuristics events (Step S14). The process then repeats.

Figure 4:
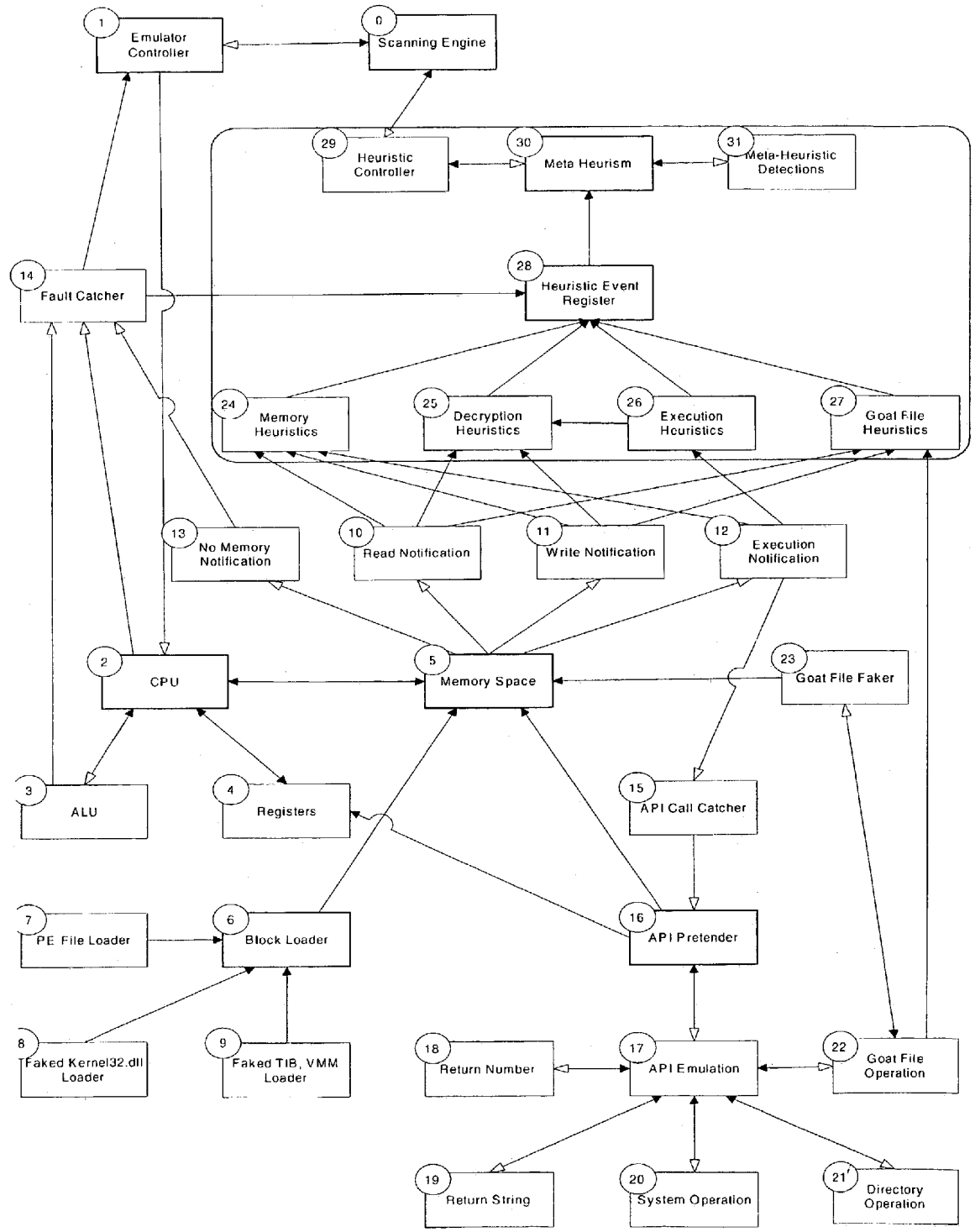
FIG. 4 is a block diagram of an emulator according to an embodiment of the present disclosure.

FIG. 4 is a block diagram of an emulator according to an embodiment of the present disclosure. When a scanning engine 0 requires emulation of a target file, it invokes emulator controller 1. Emulator controller 1 is responsible for supervising the overall general emulation. After initialization of the system, including Registers 4 and Memory Space 5, and the loading of the scanning target via PE File Loader 7, the Emulator Controller 1 calls out to the CPU 2 to execute a set number of instructions. The number of instructions to be executed may be initially set, for example, as an arbitrary number to provide a balance between speed and accuracy. For example, the more instructions executed, the more heuristic data collected and thus the greater the accuracy of the detection results. However, it should be noted that the scanner may run relatively slow if too many instructions are executed. A feedback system may also be provided. For example, if the heuristic modules are collecting a lot of data that seems to be of interest (e.g., seemingly viral), the modules may request that more instructions be executed. The detection algorithms (meta- and otherwise) may also request that more (or fewer) instructions be executed.

To execute an instruction, CPU 2 requests the relevant instruction bytes from the memory image of the target file that exists within the Memory Space 5. CPU 2 then decodes these bytes into an instruction which it then attempts to execute with the assistance of the ALU 3. As part of the emulation process, this instruction may request and/or modify data stored within Registers 4 and/or Memory Space 5.

Because much of the emulated memory within the Memory Space 5 is uninitialized by default, if an instruction accesses some of this uninitialized memory, then this accessed area will be initialized before that instruction can continue. This is accomplished by the Block Loader 6 and its sub-modules. The sub-modules include a PE File Loader 7, a Faked Kernel32.dll Loader 8 and Faked TIB, VMM, Loader 9. These modules serve to initialize certain areas of memory space 5 to particular values (e.g., a fake image of the common Kernel32.dll). However, if an area of memory is accessed which no block loader can initialize, the Memory Space 5 reports a serious error to Fault Catcher 14 via the No Memory Notification 13. Errors this serious will normally prematurely halt emulation.

Monitors are placed over particular regions of the Memory Space 5. The monitors are notified of certain types of actions that could be considered unusual and/or destructive to that region of the Memory Space 5. For example, it may not be unusual for a program to read from the Faked Kernel32.dll image. However, should a program attempt to modify the Kernel 32.dll image, this would be considered both unusual and destructive. To allow for easier distinction between innocuous and possibly handful memory accesses, there are separate monitors to receive read notifications (Read Notification monitor 10), write notifications (Write Notification monitor 11) or execute notifications (Execution Notification monitor 12). This allows only relevant data to be passed into the Memory Heuristics module 24, the Decryption Heuristics module 25, the Execution Heuristics module 26 and the Goat File Heuristics module 27.

In the particular instance that the program executes within the code section of the fake Kernel32.dll (an action which is indicative of an Applications Program Interface (API) call) the Execution Notification module 26 will be notified, and will in turn invoke the API Call Catcher 15. This will determine which API in particular is being called and will invoke the API Pretender 16 to mimic the functionality of that API. The API Pretender 16 invokes the relevant API emulation from either the Return Number sub-module 18, the Return String sub-module 19, the System Operation sub-module 20, the Directory Operation sub-module 21 or the Goat File Operation sub-module 22 via the API Emulation module 17. Each of these sub-modules handles a category of API's that are commonly used by viral code.

If an API called relates specifically to the reading of data from files other than the scanning target, the Goat File Faker 23 will place an image of a specially prepared goat file into the Memory Space 5. This may entice a virus to infect the file image, thus revealing its viral nature.

As mentioned above, when any of the unusual, destructive or goat file related events occur, the relevant heuristics module is notified. These heuristic modules may include Memory Heuristics module 24, Decryption Heuristics module 25, Execution Heuristics module 26 and Goat File Heuristics module 27. These modules are responsible for the diagnosis of viral memory access, viral decryption, viral code tricks, and viral file manipulations, respectively. These modules act as an intermediate analysis layer, collecting data and attempting to coalesce the many small, seemingly insignificant events into fewer large, more significant events. Small events can be coalesced into larger events when the heuristic modules 24–27 recognize that all of the required small events for a larger event have occurred. The heuristic modules may then generate a larger event indication and submit it to the Heuristic Event register 28. For example, if a program writes to the last section of its own image in memory, that may be considered a small-scale, mildly interesting (may be viral) event. This information can be sent to the Heuristic Event Register 28, via the Decryption Heuristic module 25. However, when many (possibly sequential) writes occur to this section of memory, the Decryption Heuristics module 25 may determine that these small events together constitute a decryption-in-progress.

Decryption Heuristics module 25 may then generate a "decryption-occurred" type event which may be sent to the Heuristic Event Register 28.

When any viral traits are detected by one or more of the heuristics modules 24–27, the corresponding module will generate a heuristic event indication and send it to the Heuristic Event Register 28 for inclusion into the event chain. When the Scanning Engine 0 decides it has emulated enough instructions, it can query the Heuristic Controller 29 for a heuristic analysis of the scanning target. The Heuristic Controller 29 will then invoke the Meta-heurism module 30, which in turn invokes a series of Meta-heuristic Detection algorithms 31. Each of the detection algorithms analyses the heuristic event chain stored in the Heuristic Event Register 28, searching for a particular series of interrelated events. If an algorithm locates its series, it is considered to have heuristically detected a virus.

Various concepts of the present disclosure may be implemented in different ways. For example, a file which is known to not have a virus may be input to the emulator and the event chain determined. Although the file does not have a virus, it may still perform actions that the heuristics may determine to be suspicious and thus an event chain can be generated. The event chain for this file can then be appended to the file or stored in a safe location on the computer system. When the file is next scanned for malicious code, the event chain determined by the emulation can then be compared to the files original event chain. If the event chains are the same (or substantially similar), the file has likely not been corrupted with a virus.

The present disclosure may be conveniently implemented using one of more conventional general purpose digital computers and/or servers programmed according to the teachings of the present specification. Appropriate software coding can readily be prepared by skilled programmers based on the teachings of the present disclosure. The present disclosure may also be implemented by the preparation of application specific integrated circuits or by interconnecting an appropriate network of conventional component circuits.

Numerous additional modifications and variations of the present disclosure are possible in view of the above-teachings. It is therefore to be understood that within the scope of the appended claims, the present disclosure may be practiced other than as specifically described herein.

What is claimed is:

1. A computer virus detection method comprising:
   compiling a list of heuristic events and a chronological order in which they occur;
   comparing the list of heuristic events and the chronological order with a defined list of heuristic events occurring in a defined chronological order; and
   determining whether a computer virus is present based on a result of said comparing.

2. A computer virus detection method as recited in claim 1, further comprising emulating a target file and determining heuristic events that occur during the emulation and compiling the list of heuristic events based on the determined heuristic events.

3. A computer virus detection method as recited in claim 1, wherein a heuristic event comprises an action that may indicate viral activity.

4. A computer virus detection method as recited in claim 1, wherein if the defined list of heuristic events and the defined chronological order concur with the compiled list of heuristic events and the chronological order in which they occur, it is determined that a virus is present.

5. A computer virus detection method as recited in claim 1, wherein it is determined that a virus is present, when at least some of the heuristic events in the compiled list of heuristic events occur in at least a similar defined order as the defined list of heuristic events.

6. A computer virus detection method as recited in claim 1, wherein the defined list of heuristic events are retrieved from a remote website.

7. A computer virus detection method as recited in claim 1, wherein if it is determined that a virus is not present based on the result of the comparing, the list of heuristic events and the chronological order are compared with another defined list of heuristic events occurring in a defined chronological order.

8. A programmed computer system including computer executable code for performing a computer virus detection, said system comprising:
   code for compiling a list of heuristic events and a chronological order in which they occur;
   code for comparing the list of heuristic events and the chronological order with a defined list of heuristic events occurring in a defined chronological order; and
   code for determining whether a computer virus is present based on a result of said comparing.

9. A programmed computer system as recited in claim 8, further comprising code for emulating a target file and determining heuristic events that occur during the emulation.

10. A programmed computer system as recited in claim 8, wherein a heuristic event comprises an action that may indicate viral activity.

11. A programmed computer system as recited in claim 8, wherein if the defined list of heuristic events and the defined chronological order concur with the compiled list of heuristic events and the chronological order in which they occur, it is determined that a virus is present.

12. A programmed computer system as recited in claim 8, wherein it is determined that a virus is present, when at least some of the heuristic events in the compiled list of heuristic events occur in a least a similar defined order as the defined list of heuristic events.

13. A programmed computer system as recited in claim 8, wherein the defined list of heuristic events are retrieved from a remote web site.

14. A programmed computer system as recited in claim 8, wherein if it is determined that a virus is not present based on the result of the comparing, the list of heuristic events and the chronological order are compared with another defined list of heuristic events occurring in a defined chronological order.

15. A computer recording medium including computer executable code for performing a computer virus detection, said computer recording medium comprising:
   code for compiling a list of heuristic events and a chronological order in which they occur;
   code for comparing the list of heuristic events and the chronological order with a defined list of heuristic events occurring in a defined chronological order; and
   code for determining whether a computer virus is present based on a result of said comparing.

16. A computer recording medium as recited in claim 15, further comprising code for emulating a target file and determining heuristic events that occur during the emulation.

17. A computer recording medium as recited in claim 15, wherein a heuristic event comprises an action that may indicate viral activity.

18. A computer recording medium as recited in claim 15, wherein if the defined list of heuristic events and the defined chronological order concur with the compiled list of heuristic events and the chronological order in which they occur, it is determined that a virus is present.

19. A computer recording medium as recited in claim 15, wherein it is determined that a virus is present, when at least some of the heuristic events in the compiled list of heuristic events occur in at least a similar defined order as the defined list of heuristic events.

20. A computer recording medium as recited in claim 15, wherein the defined list of heuristic events are retrieved from a remote website.

21. A computer recording medium as recited in claim 1, wherein if it is determined that a virus is not present based on the result of the comparing, the list of heuristic events and the chronological order are compared with another defined list of heuristic events occurring in a defined chronological order.

22. A computer virus detection method comprising:
   compiling a list of possibly viral events and a chronological order in which they occur;
   comparing the list of possibly viral events and the chronological order with a defined list of possibly viral events occurring in a defined chronological order; and
   determining whether a computer virus is present based on a result of said comparing.

23. A programmed computer system computer including computer executable code for performing a computer virus detection, said system comprising:
   code for compiling a list of possibly viral events and a chronological ordering which they occur;
   code for comparing the list of possibly viral events and the chronological order with a defined list of possibly viral events occurring in a defined chronological order; and
   code for determining whether a computer virus is present based on a result of said comparing.

24. A computer recording medium including computer executable code for performing a computer virus detection, said computer recording medium comprising:
   code for compiling a list of possibly viral events and a chronological order in which they occur;
   code for comparing the list of possibly viral events and the chronological order with a defined list of possibly viral events occurring in a defined chronological order; and
   code for determining whether a computer virus is present based on a result of said comparing.

* * * * *